Patented Nov. 21, 1939

2,180,776

UNITED STATES PATENT OFFICE 2,180,776

PROCESS FOR THE MANUFACTURE OF COMPLEX METAL COMPOUNDS OF POLYAZO DYESTUFFS

Fritz Straub, Basel, and Walter Hanhart, Riehen, Switzerland, assignors to the firm Society of Chemical Industry in Basle, Basel, Switzerland No Drawing. Application June 15, 1937, Serial No. 148,410. In Switzerland June 17, 1936

7 Claims. (Cl. 260—143)

It has been found that complex metal compounds of polyazo-dyestuffs can be produced if on the one hand agents yielding metal and on the other hand alkaline reducing agents are caused to react in the same working operation with azo-dyestuffs containing at least one nitro-group as well as lake-forming groups, this reaction being carried out in such a manner that in addition to the metallization of the dyestuff the nitro-group is converted into such a reduction stage which links two radicals of the azo-dyestuff by the grouping —N=N— or

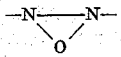

The azo-dyestuffs serving as parent materials for this invention, which may be illustrated by the following general formula

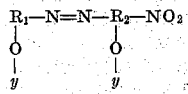

in which $R_1$ and $R_2$ represent any desired aromatic radicals and $y$ stands for hydrogen or alkyl, are converted by the action of agents yielding metal and agents having an alkaline reducing action in one and the same operation into complex metal compounds of polyazo-dyestuffs of the general formula

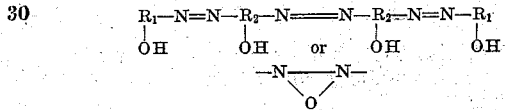

two nitro-groups of two dyestuff molecules being reduced until formation of an azo-bridge or an azoxy-bridge takes place, and the complex metal compound being formed in the same operation, if necessary with saponification of the alkoxy-groups.

Azo-dyestuffs serving as parent materials for this invention, which may be mono-, dis- or polyazo-dyestuffs and contain at least one nitro-group as well as a lake-forming group, for instance a substituted or non-substituted hydroxyl group in ortho-position to an azo-bridge, may be made, for example, by coupling a diazotized ortho-aminophenol containing as a substituent a nitro-group, preferably in para-position to the amino-group, with any coupling component, for instance amines or phenols, for example hydroxynaphthalenes and especially 1-hydroxynaphthalenes as well as their sulfonic acids, or substances whose coupling carbon atom belongs to an open chain or a heterocyclic ring. Especially suitable coupling components are the amino-hydroxynaphthalene sulfonic acids.

The application of the agent which yields metal, for example chromium, copper or nickel, and the agent which has an alkaline reducing action, for example glucose, in one and the same operation may consist in heating a solution of the dyestuff in an aqueous caustic alkali, for instance caustic soda solution or caustic potash solution, with the agent that yields metal and the reducing agent. For example, the agent yielding metal may be added to the dyestuff solution simultaneously with the reducing agent, or before or afterwards. The solution is heated in most cases advantageously to moderately raised temperatures only, for example to 50–60° C. The operation, however, can be carried out in many cases also at higher or lower temperatures. As reducing agents there may be used, besides glucose, also other carbohydrates which have a reducing action.

It is advantageous that the action of the agent yielding metal should occur in the presence of an organic compound containing hydroxyl groups which can form with the metal-yielding agent, especially an agent yielding copper, compounds stable to dilute alkali. Such compounds containing hydroxyl groups are, for example, aliphatic hydroxycarboxylic acids (for instance tartaric acid, lactic acid, glycollic acid, tartronic acid, malic acid, dihydroxytartaric acid and saccharic acid) or alcohols (for example glycerol or glycol) or derivatives of ammonia containing hydroxyl groups (for example methanolamine and ethanolamine).

The dyestuffs obtainable by the invention may be used for dyeing and printing various materials; they are especially suitable for dyeing vegetable fibers, for instance cotton, to which they impart various tints of very good fastness.

The following examples illustrate the invention, the parts being by weight:

Example 1

1.7 parts of 5-nitro-2-amino-1-hydroxybenzene are diazotized and coupled with 3.7 parts of 2-amino-5-hydroxynaphthalene-1:7-disulfonic acid; the dyestuff thus obtained is separated in the usual manner, filtered, washed with salt solution and dissolved by addition of 26.5 parts of caustic soda solution of 30 per cent. strength and 300 parts of water at 60° C. There is then added a neutral or feebly alkaline solution of 2.5 parts of crystallized copper sulfate and 3 parts of tartaric acid in 50 parts of water, simultaneously with a solution of 10 per cent. strength of 1.8 parts of grape sugar and the whole is heated for about 1 hour at 55–60° C. The dyestuff of the formula

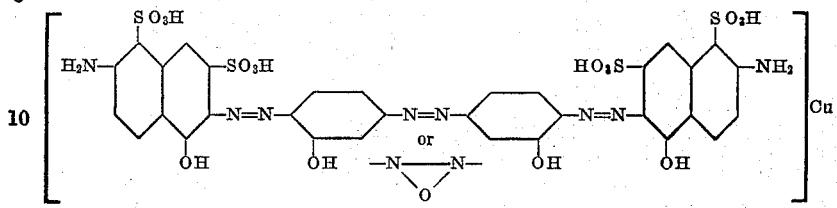

may be precipitated by addition of acetic acid and common salt. When dry it is a dark powder soluble in water to a blue solution, in concen-

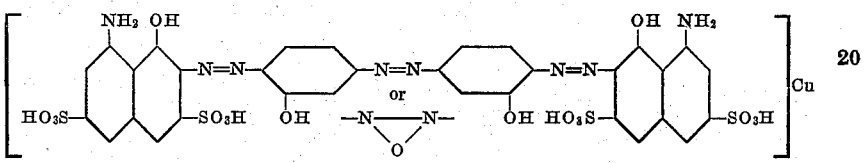

trated sulfuric acid to a reddish blue solution and dyeing cotton in a bath containing Glauber's salt blue tints fast to light.

Example 2

The dyestuff obtained by coupling the diazo-compound from 2.2 parts of 4-chloro-5-nitro-2-amino-1-hydroxybenzene with 4.1 parts of 1:8-dihydroxynaphthalene-3:6-disulfonic acid is separated and dissolved in 200 parts of water and 10.5 parts of caustic soda solution of 30 per cent. strength; this solution is mixed at 60° C. with a neutral or feebly alkaline solution of 2.5 parts of crystallized copper sulfate and 3 parts of tartaric acid in 50 parts of water and simultaneously with a solution of 2 parts of grape sugar in 20 parts of water. After stirring for 1 hour at 60° C. the whole is acidified with acetic acid and the dyestuff salted out. The dyestuff of the formula

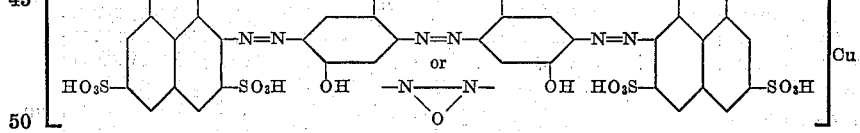

when dry is a dark powder soluble in concentrated sulfuric acid to a blue solution and in water to a violet solution and dyeing cotton in a bath con-

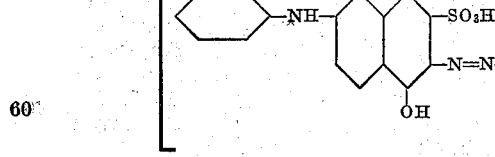

taining Glauber's salt reddish blue tints fast to light.

Example 3

1.9 parts of 5-nitro-2-amino-1-hydroxybenzene are diazotized and coupled in the usual manner with 4.2 parts of 1-amino-8-hydroxynaphthalene-3:6-disulfonic acid in alkaline solution. The separated dyestuff is washed with common salt solution and dissolved in 400 parts of water at 60° C. with addition of 33 parts of caustic soda solution of 30 per cent. strength and the solution is mixed with 20 parts of a solution of grape sugar of 10 per cent. strength and at the same time with a solution made from 2.5 parts of crystallized copper sulfate, 3 parts of tartaric acid, 50 parts of water and the quantity of caustic soda solution necessary for neutralization. The whole is stirred for about an hour at 55–60° C. and the dyestuff of the formula precipitated by acidifying with acetic acid and salting out. When dry the dyestuff is a dark powder soluble in concentrated sulfuric acid to a blue-violet solution and in water to a greenish blue solution; it dyes cotton in a bath containing Glauber's salt green-blue tints fast to light.

Example 4

The dyestuff obtained by coupling the diazo-compound from 1.54 parts of 5-nitro-2-amino-1-hydroxybenzene and 3.3 parts of 2-phenylamino-5-hydroxynaphthalene-7-sulfonic acid, if desired separated, is dissolved by addition of 10.5 parts of caustic soda solution of 30 per cent. strength in 100 parts of water at 60° C. There is added a neutral solution of 2.5 parts of crystallized copper sulfate and 3 parts of tartaric acid in 50 parts of water, to which 1.8 parts of grape sugar in the form of a solution of 10 per cent. strength has been added, and the whole is heated whilst stirring for 1 hour at about 60° C. The dyestuff of the formula

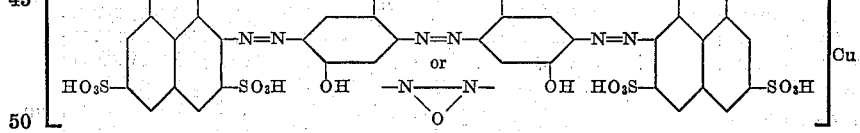

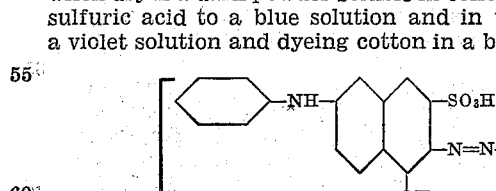

is then salted out. When dry it is a dark powder soluble in concentrated sulfuric acid to a blue-violet solution and in water to a violet solution; it dyes cotton in a bath containing Glauber's salt reddish grey tints of good fastness to light.

More or less differing dyestuffs are obtained in accordance with the conditions under which the reduction and coppering are effected; thus a blue dyeing dyestuff is obtained if the metal-yielding agent and the reducing agent are added at different periods of time, for example if first the liquor is stirred for a short time with a copper solution at 60° C. and then is reduced.

Example 5

The dyestuff obtained by coupling the diazo-compound from 1.54 parts of 5-nitro-2-amino-1-hydroxybenzene and 4.8 parts of 5:5'-dihydroxy-2:2'-dinaphthylamine-7:7'-disulfonic acid and subsequently washed with common salt solution is dissolved with addition of 20 parts of caustic soda solution of 30 per cent. strength in 250 parts of water at 60° C. 1.8 parts of grape sugar are now added dissolved in 18 parts of water and simultaneously a solution of 2.5 parts of crystallized copper sulfate and 3 parts of tartaric acid in 50 parts of water neutralized or adjusted to slight alkalinity with caustic soda solution. The whole is stirred for 1 hour at about 60° C. and the dyestuff of the formula

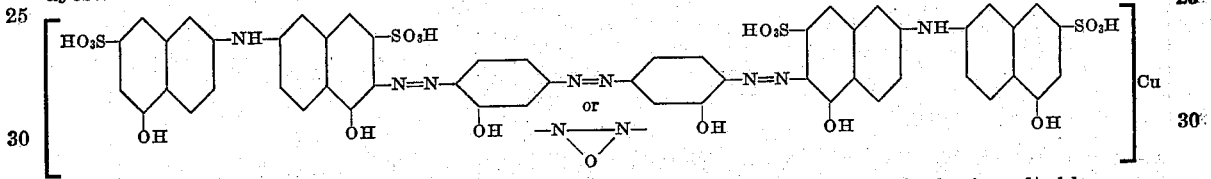

precipitated by neutralization and salting out. The dry dyestuff is a dark powder soluble in water and in concentrated sulfuric acid to blue solutions and dyeing cotton in a bath containing Glauber's salt blue-grey tints.

Instead of the neutral solution of copper sulfate and tartaric acid in water there may be used as the metallizing agent a copper salt of an aliphatic aminocarboxylic acid, for instance aminoacetic acid.

Example 6

The dyestuff obtained by coupling the diazo-compound from 1.7 parts of 5-nitro-2-amino-1-hydroxybenzene with 4 parts of 2-benzoylamino-5-hydroxynaphthalene-7-sulfonic acid and salting out is dissolved in 400 parts of water at 60° C. and the solution is mixed with 33 parts of caustic soda solution of 30 per cent. strength. There is then added a neutralized solution of 2.5 parts of crystallized copper sulfate and 3 parts of tartaric acid in 50 parts of water to which have been added 1.5 parts of grape sugar in the form of a solution of 10 per cent. strength; the whole is now kept for 30 minutes at 55–60° C. After neutralization with dilute acetic acid or mineral acid common salt is added and the cupriferous dyestuff of the formula

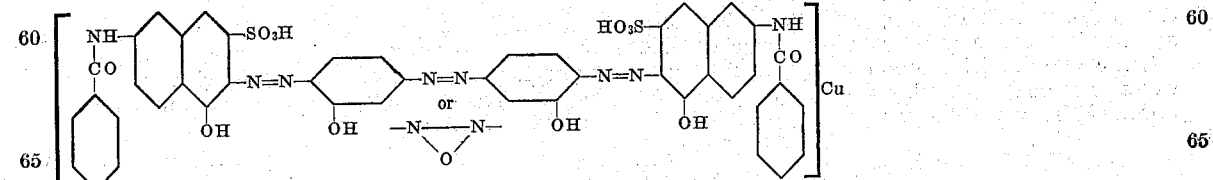

is filtered. The dry dyestuff is a dark powder soluble in dilute sodium carbonate solution to a blue-violet solution and in concentrated sulfuric acid to a dirty violet solution; it dyes cotton in a bath containing Glauber's salt blue-green tints very fast to light.

Example 7

2.4 parts of 5-nitro-2-amino-1-hydroxybenzene are diazotized and coupled in the usual manner in alkaline solution with 3.9 parts of 2-amino-8-hydroxynaphthalene-6-sulfonic acid. The dyestuff thus obtained is purified and dissolved in 100 parts of water with addition of 13 parts of caustic soda solution of 30 per cent. strength and a neutral solution of 2.5 parts of crystallized copper sulfate and 3 parts of tartaric acid in 50 parts of water together with a solution of 10 per cent. strength of grape sugar containing 1.5 parts of the latter. After stirring for 1 hour at 55–60° C. the whole is neutralized approximately with dilute acid, common salt is added if necessary and the dyestuff of the formula

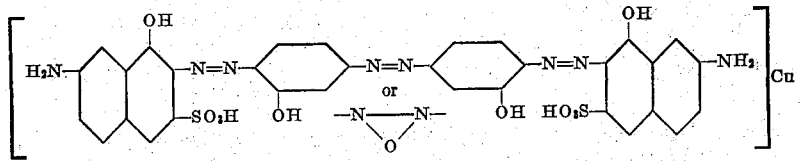

filtered. When dry it is a dark powder soluble in concentrated sulfuric acid and dilute caustic soda solution to blue solutions and dyeing cotton in a bath containing Glauber's salt blue-grey tints very fast to light.

Example 8

2.6 parts of 5-nitro-2-amino-1-hydroxybenzene are diazotized and coupled with 4.2 parts of 1-amino-8-hydroxynaphthalene-4-sulfonic acid in alkaline solution. The separated and washed dyestuff is dissolved with addition of 20 parts of caustic soda solution of 30 per cent. strength in 300 parts of water at 60° C., at which temperature there is added a neutral or alkaline solution of 2.5 parts of crystallized copper sulfate and 3 parts of tartaric acid in 50 parts of water to which 1.5 parts of grape sugar in the form of a solution of 10 per cent. strength has been added and the whole is heated whilst stirring for 1 hour at about 60° C. Some common salt is now added and the mixture is neutralized with dilute mineral acid until brilliant paper shows only a feeble alkaline reaction, whereupon the dyestuff of the formula

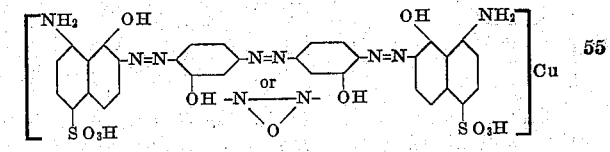

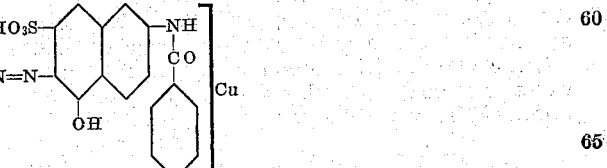

is precipitated. When dry the dyestuff is a dark powder soluble in concentrated sulfuric acid and in water to blue solutions and dyeing cotton and viscose in a bath containing Glauber's salt greenish grey tints very fast to light.

Example 9

1.7 parts of 5-nitro-2-amino-1-hydroxybenzene are diazotized and coupled with 4.4 parts of 2-

(4'- hydroxy - 3'- carboxy)-phenylamino - 5- hydroxynaphthalene-7-sulfonic acid. The dyestuff thus obtained is separated, purified, dissolved in 250 parts of water at 60° C. with addition of 24 parts of caustic soda solution of 30 per cent. strength and then treated for about 10 minutes with an agent yielding copper which may consist of a solution of 2.5 parts of crystallized copper sulfate and 3 parts of tartaric acid and 50 parts of water and the quantity of caustic soda solution necessary for neutralization. 1.8 parts of grape sugar forming a solution of 10 per cent. strength hydroxybenzene with 12.2 parts of 8:8'-dihydroxy-2:2'-dinaphthylamine-6:6'-disulfonic acid is separated, purified and dissolved in 200 parts of water at 60° C. with the aid of 20 parts of caustic soda solution of 30 per cent. strength. To the solution is added a neutral solution of 2.5 parts of crystallized copper sulfate and 3 parts of tartaric acid in 50 parts of water and at the same time 1.8 parts of grape sugar in the form of a solution of 10 per cent. strength. The whole is heated while stirring for about 1 hour at 55–60° C. and the dyestuff of the formula

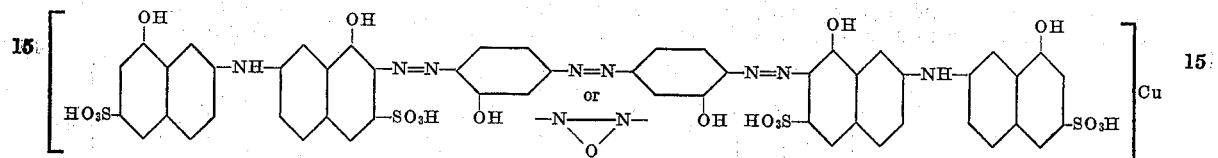

is now added and the mixture is heated for an hour at 60° C., then acidified with acetic acid and finally the dyestuff of the formula is precipitated by means of common salt and dilute acid added until the alkaline reaction is feeble. The dry dyestuff is a dark powder soluble

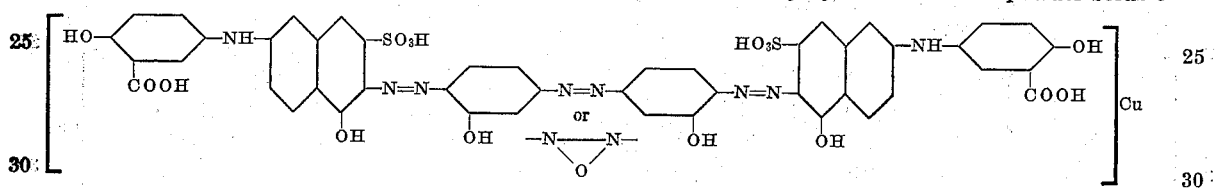

salted out. When dry it is a dark powder soluble in water and in concentrated sulfuric acid to blue solutions and dyeing cotton and artificial silk from regenerated cellulose blue tints in a bath containing Glauber's salt.

in concentrated sulfuric acid to a violet solution and in water to a reddish blue solution. It dyes cotton in a bath containing Glauber's salt greenish grey fast tints.

*Example 10*

The dyestuff obtained by coupling the diazo-compound from 1.9 parts of 5-nitro-2-amino-1-hydroxybenzene and 4.1 parts of 2-phenylamino-8-hydroxynaphthalene-6-sulfonic acid is purified and dissolved with addition of 20 parts of caustic soda solution of 30 per cent. strength in 250 parts of water; the solution is heated for ¾ hour at 55–60° C. with a neutral solution of 2.5 parts of crystallized copper sulfate and 3 parts of tartaric acid in 50 parts of water to which has been added a solution of 10 per cent. strength of 1.5 parts of grape sugar. The reduced metallized dyestuff of the formula

*Example 12*

5.8 parts of the sodium salt of the dyestuff from diazotized 2-amino-5-nitro - 1 - methoxy-benzene and 2-(3'- carboxy - phenylamino) - 8 - hydroxy-naphthalene-6-sulfonic acid are dissolved in the form of a paste in 500 parts of water at 65° C. with the aid of 6.2 parts of caustic soda solution of 30 per cent. strength; after addition of 1.3 parts of glucose in the form of a solution of 10 per cent. strength the solution is heated for about ¾ hour at 65–70° C. It is then neutralized with dilute acid until brilliant yellow paper shows only weak alkalinity. After addition of the solution obtained from 3 parts of crystallized copper sul-

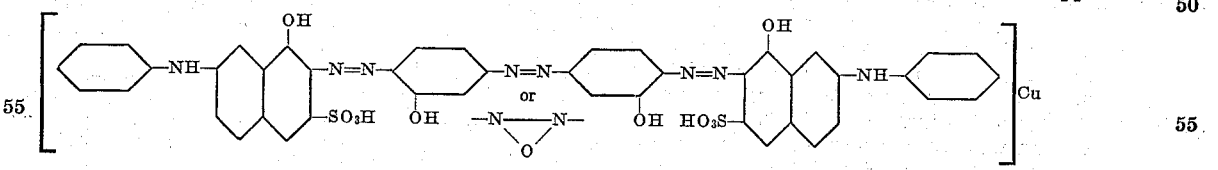

is precipitated in larger part; complete precipitation is attained by addition of a dilute acid until the reaction is only feebly alkaline. The dry dyestuff is a dark powder soluble in concentrated sulfuric acid and in dilute alkali solution to blue-violet solutions and dyeing cotton in a bath containing Glauber's salt grey tints.

fate and 12 parts of water and 9 parts of ammonia solution of 25 per cent. strength the whole is stirred for about 12 hours at 80–85° C., whereby the methoxy-groups are saponified with formation of the complex copper compound of the azo-dyestuff. After addition of common salt the dyestuff of the formula

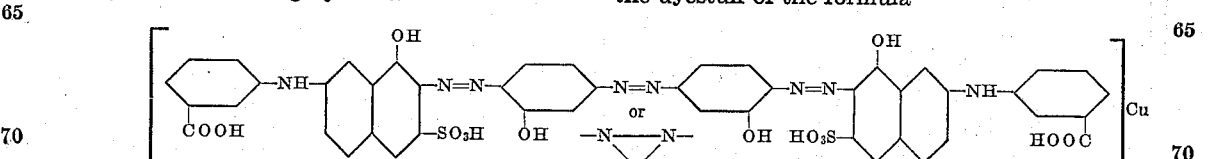

*Example 11*

The dyestuff obtained by coupling the diazo-compound from 3.8 parts of 5-nitro-2-amino-1- is filtered and dried. It is a dark powder soluble in water to a dull violet solution and in concentrated sulfuric acid to a greenish blue solution.

It dyes cotton in a bath containing Glauber's salt fast grey tints.

Example 13

5.3 parts of the sodium salt of the azo-dyestuff from diazotized 2-amino-5-nitro-1-methoxybenzene and 1-hydroxynaphthalene-3:6-disulfonic acid are dissolved in 300 parts of water with the aid of 9.3 parts of caustic soda solution of 30 per cent. strength. At a temperature of about 75° C. and in the course of ½ hour 1.2 parts of grape sugar dissolved in 12 parts of water are added by drops and then the whole is stirred for a further ½ hour at the same temperature. After the mass has been neutralized with acetic acid and has been mixed with a solution made from 3 parts of crystallized copper sulfate, 12 parts of water and 9 parts of a solution of ammonia of 25 per cent. strength the whole is heated for about 10 hours at 80–90° C. After neutralization with acetic acid the dyestuff of the formula

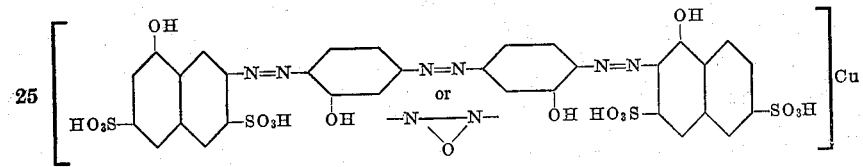

is salted out. When dry it is a dark powder soluble in water to a reddish blue solution and in concentrated sulfuric acid to a greenish blue solution, and dyeing cotton in a bath containing Glauber's salt blue tints.

Example 14

5.3 parts of the azo-dyestuff from diazotized 2-amino-5-nitro-1-methoxybenzene and 2-hydroxynaphthalene-5:7-disulfonic acid are dissolved in 300 parts of water with addition of 7.8 parts of caustic soda solution of 30 per cent. strength. At a temperature of 65° C. and in the course of ½ hour 1.2 parts of grape sugar dissolved in 12 parts of water are added in drops and the whole is stirred for ½ hour at the same temperature and neutralized with acetic acid. There is now added a solution made from 3.3 parts of crystallized copper sulfate, 15 parts of water and 10 parts of an ammonia solution of 25 per cent. strength and the mass is heated for about 12 hours at 80–90° C. After acidifying with acetic acid the dyestuff of the formula

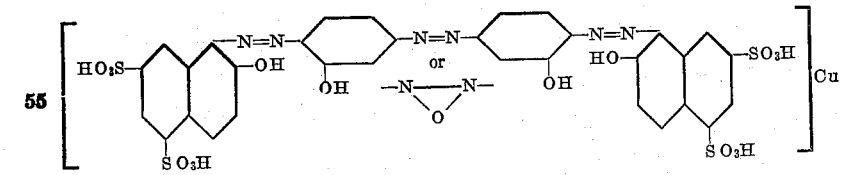

is salted out. When dry it is a dark powder soluble in water and in concentrated sulfuric acid to blue violet solutions and dyeing cotton reddish blue tints in a bath containing Glauber's salt.

What we claim is:

1. Process for the manufacture of complex metal compounds of polyazo-dyestuffs, which comprises causing agents yielding metal and alkaline reducing agents to react in the same working operation with azo-dyestuffs containing at least one nitro-group in para-position to an azo-group as well as lake-forming groups, this reaction being carried out in such a manner that in addition to the metallization of the dyestuff the nitro-group is converted into such a reduction stage which links two radicals of the azo-dyestuff by a member of the group consisting of —N=N— and

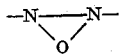

2. Process for the manufacture of complex metal compounds of polyazo-dyestuffs, which comprises causing agents yielding metal and alkaline reducing agents to react in the same working operation with azo-dyestuffs of the general formula

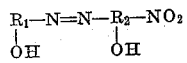

wherein $R_1$ represents a naphthalene radical and $R_2$ represents a benzene radical, wherein further the hydroxyl groups of the radicals $R_1$ and $R_2$ stand in ortho-position to the azo-group and the nitro-group stands in para-position to the azo-group, this reaction being carried out in such a manner that in addition to the metallization of the dyestuff the nitro-group is converted into such a reduction stage which links two radicals of the azo-dyestuff by a member of the group consisting of —N=N— and

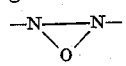

3. Process for the manufacture of complex metal compounds of polyazo-dyestuffs, which comprises causing agents yielding metal and alkaline reducing agents to react in the same working operation with azo-dyestuffs of the general formula

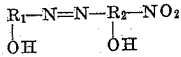

wherein $R_1$ represents a naphthalene radical which is linked in 2-position with the azo-group and $R_2$ represents a benzene radical, wherein further the hydroxyl groups of the radicals $R_1$ and $R_2$ stand in ortho-position to the azo-group and the nitro-group stands in para-position to the azo-group, this reacion being carried out in such a manner that in addition to the metallization of the dyestuff the nitro-group is converted into such a reduction stage which links two radicals of the azo-dyestuff by a member of the group consisting of —N=N— and

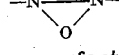

4. Process for the manufacture of complex copper compounds of polyazo-dyestuffs, which comprises causing agents yielding copper and alkaline reducing agents to react in the same working operation with azo-dyestuffs of the general formula

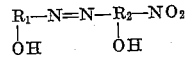

wherein $R_1$ represents a naphthalene radical which is linked in 2-position with the azo-group and $R_2$ represents a benzene radical, wherein further the hydroxyl groups of the radicals $R_1$ and $R_2$ stand in ortho-position to the azo-group and the nitro-group stands in para-position to the azo-group, this reaction being carried out in such a manner that in addition to the coppering of the dyestuff the nitro-group is converted into such a reduction stage which links two radicals of the azo-dyestuff by a member of the group consisting of —N=N— and

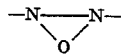

5. Process for the manufacture of complex copper compounds of polyazo-dyestuffs, which comprises causing alkaline reducing agents and agents yielding copper to react in the presence of organic compounds containing hydroxyl groups in the same working operation with azo-dyestuffs of the general formula

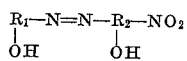

wherein $R_1$ represents a naphthalene radical which is linked in 2-position with the azo-group and $R_2$ represents a benzene radical, wherein further the hydroxyl groups of the radicals $R_1$ and $R_2$ stand in ortho-position to the azo-group and the nitro-group stands in para-position to the azo-group, this reaction being carried out in such a manner that in addition to the formation of the copper compound of the dyestuff the nitro-group is converted into such a reduction stage which links two radicals of the azo-dyestuff by a member of the group consisting of —N=N— and

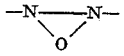

6. Process for the manufacture of complex copper compounds of polyazo-dyestuffs, which comprises causing grape sugar and agents yielding copper to react in an alkaline medium and in the presence of organic compounds containing hydroxyl groups in the same working operation with azo-dyestuffs of the general formula

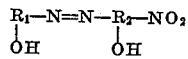

wherein $R_1$ represents a naphthalene radical which is linked in 2-position with the azo-group and $R_2$ represents a benzene radical, wherein further the hydroxyl groups of the radicals $R_1$ and $R_2$ stand in ortho-position to the azo-group and the nitro-group stands in para-position to the azo-group, this reaction being carried out in such a manner that in addition to the formation of the copper compound of the dyestuff the nitro-group is converted into such a reduction stage which links two radicals of the azo-dyestuff by a member of the group consisting of —N=N— and

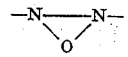

7. Process for the manufacture of complex copper compounds of polyazo-dyestuffs, which comprises causing grape sugar and agents yielding copper to react in an alkaline medium and in the presence of salts of tartaric acid in the same working operation with azo-dyestuffs of the general formula

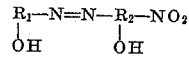

wherein $R_1$ represents a naphthalene radical which is linked in 2-position with the azo-group and $R_2$ represents a benzene radical, wherein further the hydroxyl groups of the radicals $R_1$ and $R_2$ stand in ortho-position to the azo-group and the nitro-group stands in para-position to the azo-group, this reaction being carried out in such a manner that in addition to the formation of the copper compound of the dyestuff the nitro-group is converted into such a reduction stage which links two radicals of the azo-dyestuff by a member of the group consisting of —N=N— and

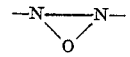

FRITZ STRAUB.
WALTER HANHART.